United States Patent
Sakama et al.

(10) Patent No.: US 7,352,285 B2
(45) Date of Patent: Apr. 1, 2008

(54) IC TAG MOUNTING ON A HARNESS AND HARNESS MOUNTING METHOD

(75) Inventors: Isao Sakama, Hiratsuka (JP); Minoru Ashizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 11/039,824

(22) Filed: Jan. 24, 2005

(65) Prior Publication Data

US 2006/0049942 A1 Mar. 9, 2006

(30) Foreign Application Priority Data

Sep. 3, 2004 (JP) ............................. 2004-256654

(51) Int. Cl.
*G08B 13/14* (2006.01)
(52) U.S. Cl. ................. 340/572.1; 340/572.2; 340/572.4; 340/572.7; 340/539.1; 340/825.69
(58) Field of Classification Search ............. 340/572.1, 340/572.2, 572.4, 572.7, 539.1, 825.69; 235/380, 235/383, 492; 370/338, 444, 438; 439/607
See application file for complete search history.

(56) References Cited

U.S. PATENT DOCUMENTS

| | | | | |
|---|---|---|---|---|
| 5,357,091 | A * | 10/1994 | Ozawa et al. | 235/380 |
| 6,993,298 | B2 * | 1/2006 | Licht | 455/90.3 |
| 2005/0253726 | A1 * | 5/2005 | Yoshida et al. | |
| 2005/0215119 | A1 | 9/2005 | Kaneko et al. | |

| | | | |
|---|---|---|---|
| 2006/0049942 | A1 | 3/2006 | Sakama et al. |

FOREIGN PATENT DOCUMENTS

| | | |
|---|---|---|
| JP | 2004-152543 | 12/2003 |
| JP | 2004-152543 | 5/2004 |

OTHER PUBLICATIONS

English translation of German language—Finkezeller, K., RFID Handbook, 2002, 5 pages.
German language—Finkezeller, K., RFID Handbook, 2002, pp. 29-61.

* cited by examiner

*Primary Examiner*—Hung Nguyen
(74) *Attorney, Agent, or Firm*—Mattingly, Stanger, Malur & Brundidge, PC

(57) ABSTRACT

An IC chip and a minute antenna for conducting transmission with a weak radio wave are mounted on a male connector. An auxiliary antenna for amplifying the weak radio wave emitted by the minute antenna and transmitting the amplified radio wave is mounted on a female connector. If the male connector is fitted into the female connector normally, then the distance between the minute antenna and the auxiliary antenna becomes 1.0 mm or less, and consequently the weak radio wave transmitted by the minute antenna is amplified by the auxiliary antenna and transmitted to the outside. Unless fitting is conducted normally, then the distance between the minute antenna and the auxiliary antenna becomes longer than 1.0 mm, and consequently the weak radio wave emitted the minute antenna is not amplified and transmitted. By receiving the information stored on the IC chip, the fitting state of the connectors can be checked.

9 Claims, 7 Drawing Sheets

A-TYPE HARNESS

B-TYPE HARNESS

FALSE FITTING OF
B-TYPE WITH A-TYPE

IC TAG MOUNTING ON A HARNESS AND HARNESS MOUNTING METHOD

INCORPORATION BY REFERENCE

The present application claims priority from Japanese application JP 2004-256654 filed on Sep. 3, 2004, the content of which is hereby incorporated by reference into this application.

BACKGROUND OF THE INVENTION

1. Field of the Invention

The present invention relates to an IC tag mounting for a harness which mounts a wireless IC tag to transmit information recorded in an IC chip from an antenna in a wireless form, and a harness mounting method for mounting this IC tag-mounted harness on an electrical apparatus.

2. Description of the Related Art

In recent years, wireless IC tags are used vigorously to confirm articles or confirm fitting states of articles. For example, JP-A-2004-152543 discloses a technique for mounting a wireless IC tag on a connector, reading information in the connector, and sensing the fitting state of the connector. This technique is constructed to mount a tag chip including an IC chip and a minute antenna on a male side of the connector, transmit information stored in the tag chip to an antenna disposed on a substrate which fixes a female side of the connector, and make a reader/writer mounted on the antenna read information stored in the tag chip without making a contact. At this time, the radio wave propagation distance between the minute antenna on the female side of the connector and the antenna on the male side is approximately 3 mm, and the reader/writer receives the radio wave of the antenna in the state in which the reader/writer is mounted on the antenna. Therefore, the information stored in the tag chip can be transmitted from the reader/writer by a CPU in an electrical apparatus (for example, such as an ECU (electronic control unit) on a vehicle) without being leaked to the outside.

In the technique disclosed in JP-A-2004-152543, however, there is a drawback that the information stored in the tag chip cannot be read unless the reader/writer is within an extremely short distance from the antenna, although there is an advantage that the information stored in the tag chip does not leak to the outside. For example, when reading information stored in the tag chip and checking whether one of the connectors is fitted into the other normally, the reader/writer must be brought into an extremely short distance from the antenna and the fitting state must be inspected, resulting in a problem of being inconvenient to use.

BRIEF SUMMARY OF THE INVENTION

In view of the problems heretofore described, the present invention has been achieved. An object of the present invention is to provide an IC tag mounting on a harness capable of simply checking the fitting state of a harness and fitting errors by reading information stored in a wireless IC tag in the harness from a desired position, and a harness mounting method for mounting this IC tag harness on an electrical apparatus.

An IC tag mounting on a harness according to the present invention has been contrived in order to achieve the object. An IC tag mounting on a harness according to a first aspect of the present invention is an IC tag harness with a wireless IC tag mounted on connectors of a harness used for electrical connection among a plurality of electrical members. The wireless IC tag includes an IC chip to record information and an antenna to conduct wireless transmission of the information recorded on the IC chip. The IC chip and a minute antenna for transmitting the information recorded on the IC chip with a weak radio wave are mounted on a first connector (for example, a male connector) connected to a first electrical member. An auxiliary antenna for amplifying a radio wave emitted by the minute antenna and transmitting the amplified radio wave is mounted on a second connector (for example, a female connector) connected to electrical members other than the first electrical member. The auxiliary antenna is mounted so as to be located in a position suitable for amplifying the radio wave emitted by the minute antenna when one of the first and second connectors is fitted into the other normally.

An IC tag mounting on a harness according to a second aspect of the present invention is an IC tag mounting on a harness with a wireless IC tag mounted on a harness used for electrical connection among a plurality of electrical members. The wireless IC tag includes an IC chip to record information and an antenna to conduct wireless transmission of the information recorded on the IC chip. A first IC chip for recording first information, a minute antenna for transmitting the information recorded in the first IC chip, with a weak radio wave, a second IC chip for recording second information, and an ordinary antenna for transmitting the information recorded in the second IC chip, with a strong radio wave are mounted on a first connector connected to a first electrical member. An auxiliary antenna for amplifying a radio wave emitted by the minute antenna and transmitting the amplified radio wave is mounted on a second connector connected to electrical members other than the first electrical member. The auxiliary antenna hangs over the ordinary antenna and intercepts the strong radio wave emitted by the ordinary antenna. The auxiliary antenna is mounted so as to be located in a position suitable for amplifying the radio wave emitted by the minute antenna, and hanging over the ordinary antenna to intercept the strong radio wave emitted by the ordinary antenna, when one of the first connector and the second connector is fitted into the other normally.

Other objects, features and advantages of the invention will become apparent from the following description of the embodiments of the invention taken in conjunction with the accompanying drawings.

BRIEF DESCRIPTION OF THE DRAWINGS

FIGS. 2A-2B are schematic configuration diagrams of an IC tag mounting on a harness in a first embodiment, in which FIG. 2A shows a state before fitting, and FIG. 2B shows a state after fitting;

FIGS. 3A-3B are schematic configuration diagrams of an IC tag mounting on a harness in a second embodiment, in which FIG. 3A shows a state before fitting, and FIG. 3B shows a state after fitting;

DETAILED DESCRIPTION OF THE INVENTION

Figure 1:
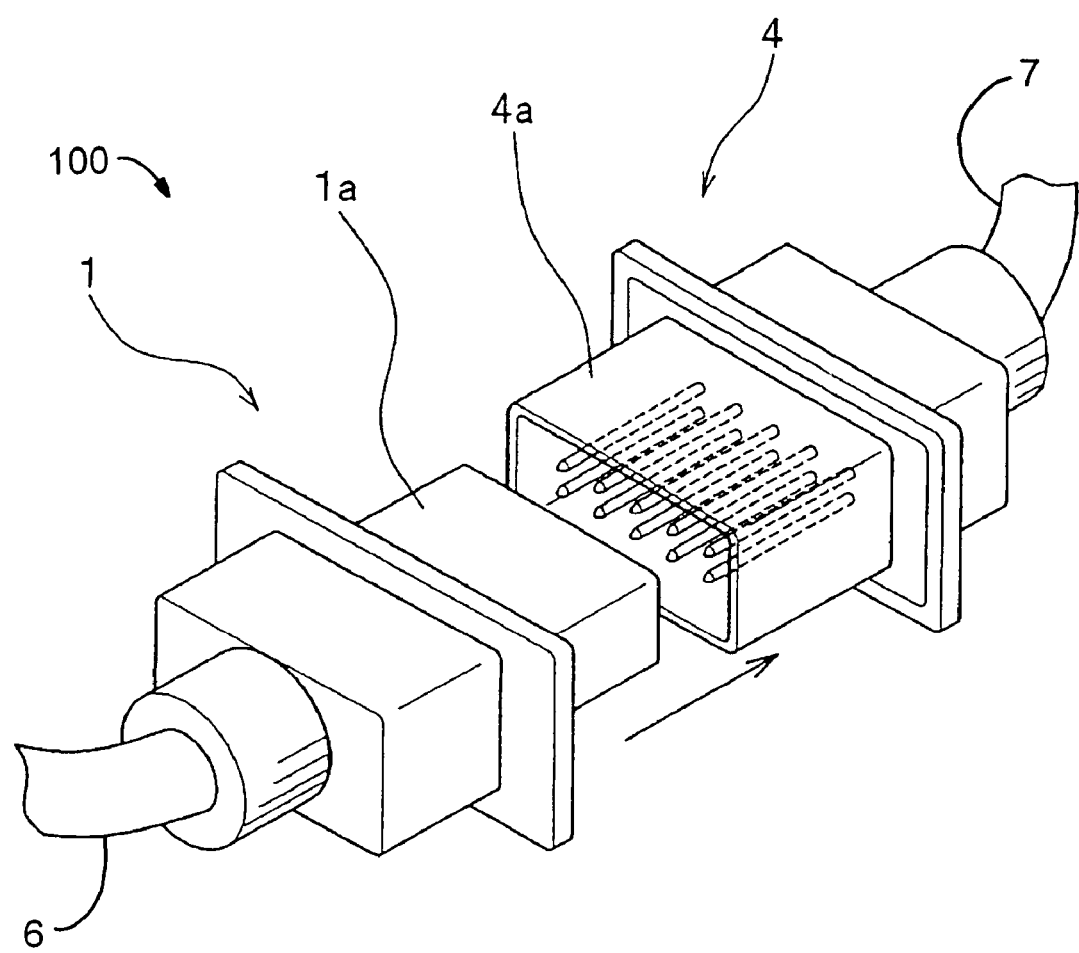
FIG. 1 is a diagram showing a connector portion of a wire harness used in an embodiment of the present invention.

Hereafter, several preferred embodiments of an IC tag mounting on a harness according to the present invention will be described with reference to the drawings. In the drawings used for embodiments hereafter described, the same components are denoted by like numerals. In the embodiments hereafter described, a mounting state in which wires are connected to a harness is referred to as a wire harness in order to image a specific mounting state of the harness.

First, an outline of an IC tag mounting on a harness in the embodiments is hereafter described. In the IC tag-mounted harness according to the first aspect of the present invention, an IC chip and a minute antenna for transmitting information recorded in the IC chip by using a radio wave are mounted on one of connectors in a wire harness (for example, a male connector), whereas an auxiliary antenna for amplifying a weak radio wave transmitted from the minute antenna and transmitting the amplified radio wave are mounted on the other of connectors in the wire harness. Mounting positions of the minute antenna and the auxiliary antenna are made close to have a distance of 1.0 mm or less (for example, approximately 0.5 mm) between so as to make it possible for the auxiliary antenna to amplify the radio wave emitted from the minute antenna when the one of the connectors in the wire harness is fitted into the other normally. Only when one of the connectors is fitted into the other normally, therefore, the auxiliary antenna amplifies the weak radio wave emitted by the minute antenna and transmits the amplified radio wave. Therefore, it is possible to detect whether fitting is conducted normally in the wire harness by receiving the signal at a reader/writer.

According to the second aspect of the present invention, a minute antenna mounting a first IC chip and transmitting information stored in the first IC chip, and an ordinary antenna mounting a second IC chip and transmitting information stored in the second IC chip by means of a strong radio wave are mounted on one of the connectors in the harness so as to be parallel to the fitting direction. An auxiliary antenna amplifying the weak radio wave emitted by the minute antenna and transmitting the amplified radio wave is mounted on the other of the connectors in the wire harness. At this time, the mounting position of the auxiliary antenna is determined as described below. The auxiliary antenna is positioned so as to make the distance between the minute antenna and the auxiliary antenna equal to 1.0 mm or less (for example, approximately 0.5 mm) and make the auxiliary antenna hang over the ordinary antenna to intercept a strong radio wave emitted by the ordinary antenna, when one of the connectors is fitted into the other normally. As a result, the auxiliary antenna amplifies the radio wave emitted by the minute antenna and transmits the amplified radio wave, when one of the connectors is fitted into the other normally. By receiving a radio wave from the auxiliary antenna or the ordinary antenna, therefore, it is possible to distinguish between the state in which one of the connectors is fitted into the other normally and a state in which one of the connectors is not fitted into the other normally, and it is also possible to identify a harness on which one of the connectors is not fitted into the other.

FIRST EMBODIMENT

FIG. 1 is a diagram showing connector portions of the wire harness 100 used in the present embodiment. A male connector 1 includes an insertion end 1a. A female connector 4 includes an accepting frame 4a. When the insertion end 1a of the male connector 1 is inserted into the accepting frame 4a in an insertion direction indicated by an arrow as far as a bottom of the accepting frame 4a, connection in the wire harness is conducted, whereby one or more first electrical members 6 are electrically connected to one or more second electrical members 7. At this time, a predetermined gap is formed between an outside periphery face of the insertion end 1a and an inside periphery face of the accepting frame 4a.

Figure 2A:
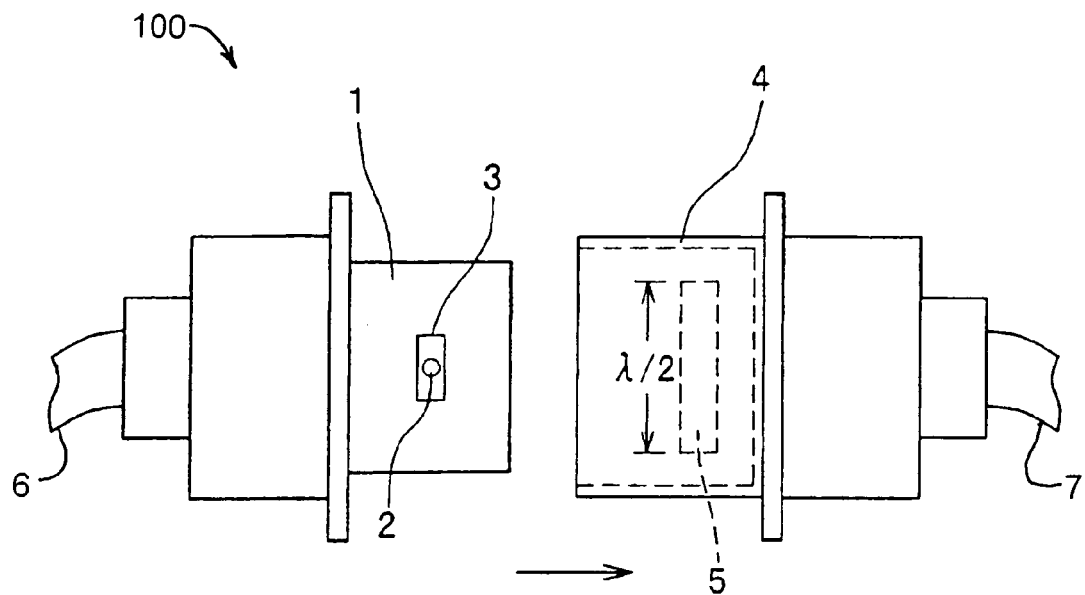
Figure 2B:
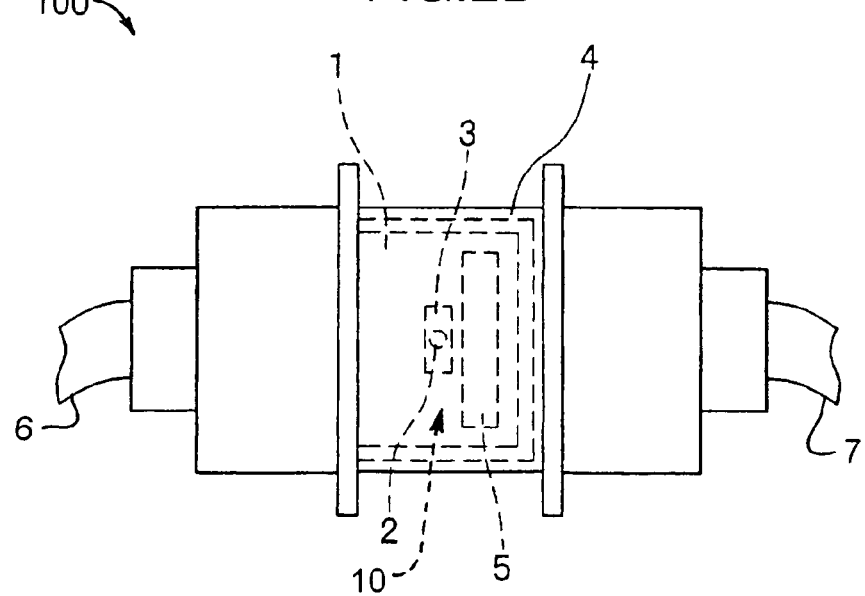

FIGS. 2A-2B are schematic configuration diagrams of an IC tag mounting on harness 100 in the present embodiment, in which FIG. 2A shows a state before fitting, and FIG. 2B shows a state after fitting. In the ensuing description, the surface of the insertion end 1a of the male connector 1 is referred to as surface of the male connector 1, and the surface or inside face of the accepting frame 4a of the female connector 4 is referred to as surface or inside face of the female connector, for brevity of the description.

As shown in FIG. 2A, a minute antenna 3 having an IC chip 2 placed substantially on its center is mounted on the surface of the male connector 1 included in the wire harness. The IC chip 2 is housed in a small package that has, for example, a width of approximately 0.4 mm, a length of approximately 0.4 mm, and a height of approximately 0.1 mm. Various kinds of information concerning the wire harness are previously recorded in the IC chip 2. The minute antenna 3 having the package of the IC chip 2 mounted thereon is so small that it cannot transmit a radio wave that can be read to the outside of the wire harness 100 (in other words, it can transmit the radio wave as far as only approximately several mm). For example, the minute antenna 3 has a size that is approximately 1.6 mm in width and approximately 7 mm in length.

An auxiliary antenna 5 for amplifying a weak radio wave emitted by the minute antenna 3 and transmitting the amplified radio wave into a desired direction is mounted on the surface or inside face of the female connector 4 included in the wire harness. The auxiliary antenna 5 has an electrical length of $\lambda/2$. Here, $\lambda$ is not a wavelength of the radio wave in the vacuum, but it is a wavelength of the radio wave in use on a dielectric which is a basic material of the auxiliary antenna 5. The auxiliary antenna 5 has a width of approximately 1.6 mm which is the same as the minute antenna 3 has. Mounting positions of the minute antenna 3 and the auxiliary antenna 5 have a position relation so as to make the distance between the minute antenna 3 and the auxiliary antenna 5 equal to 1.0 mm or less (for example, approximately 0.5 mm) when the male connector 1 is fitted into the female connector 4 normally.

In other words, if the male connector 1 is fitted into the female connector 4 normally as shown in FIG. 2B, the distance between the minute antenna 3 and the auxiliary antenna 5 becomes 1.0 mm or less (for example, approximately 0.5 mm), and consequently the weak radio wave emitted by the minute antenna 3 to transmit the information stored in the IC chip 2 can be amplified by the auxiliary antenna 5 and transmitted to a desired direction. On the other hand, when the male connector 1 is not fitted into the female connector 4 normally, the deviation width between the minute antenna 3 and the auxiliary antenna 5 becomes larger than 0.5 mm, and consequently the weak radio wave emitted by the minute antenna 3 is not amplified by the auxiliary antenna 5 and transmitted.

Thus, only when the male connector is fitted into the female connector normally, a wireless IC tag 10 which can conduct transmission is formed of the minute antenna 3 having the IC chip 2 placed thereon (stuck thereto) and the auxiliary antenna 5. Since the information stored in the IC chip 2 can be transmitted to the outside, it is possible to read the information stored in the IC chip 2 which is placed on (stuck to) the connector, by using the reader/writer, and detect whether the male connector is fitted into the female connector normally.

The IC tag 10 mounted on harness 100 according to the first embodiment is constructed as heretofore described. The minute antenna 3 and the auxiliary antenna 5 can be formed by depositing metal thin films on the surface of the male connector 1 and the inside face of the female connector 4 by means of evaporation. Or they can be formed by sticking metal to each of the connectors.

SECOND EMBODIMENT

Figure 3A:
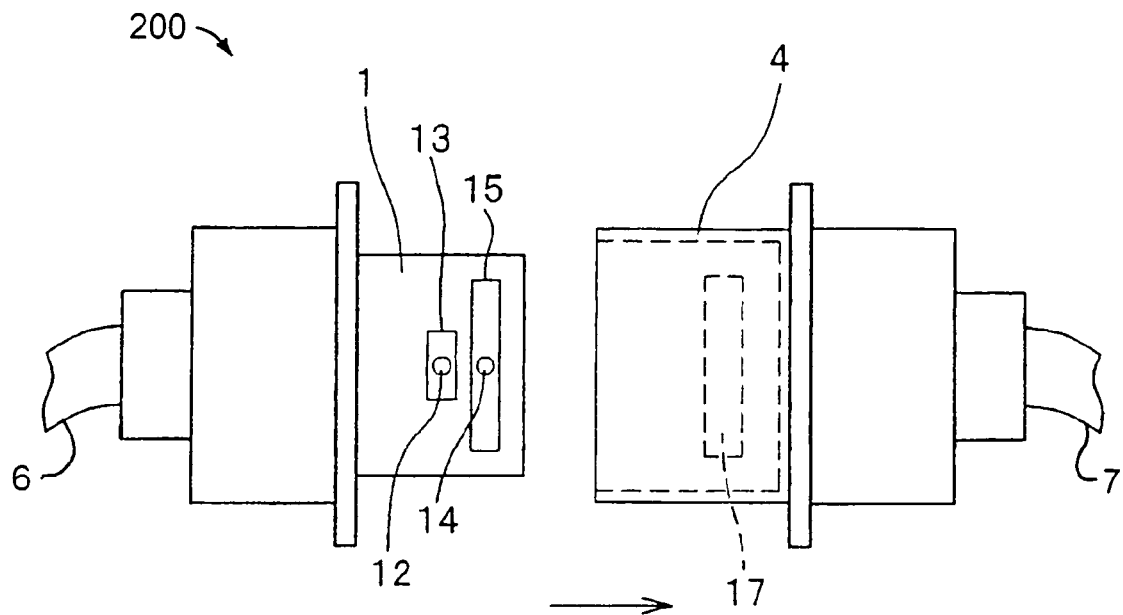
Figure 3B:
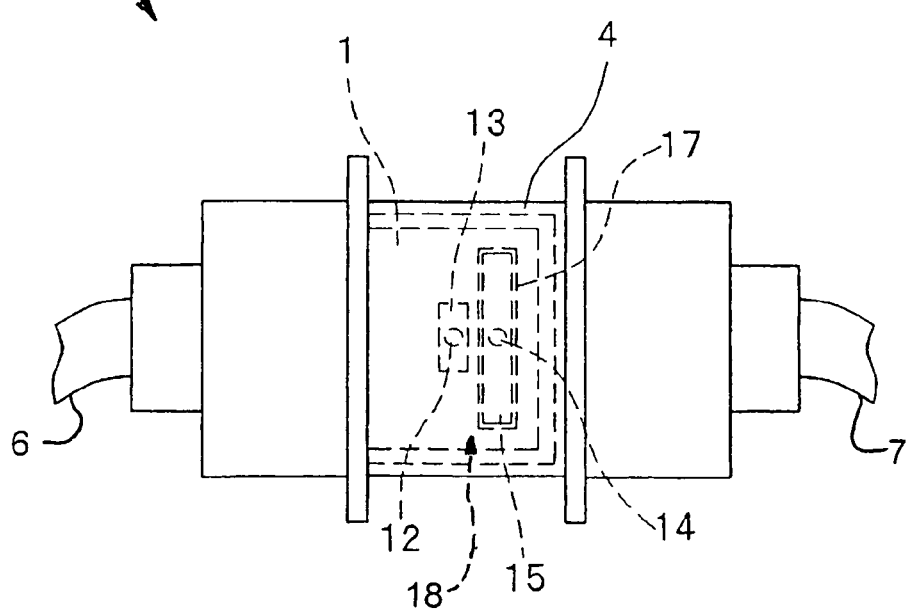

FIGS. 3A-3B are schematic configuration diagrams of an IC tag 18 mounting on a harness 200 in a second embodiment, in which FIG. 3A shows a state before fitting, and FIG. 3B shows a state after fitting. As shown in FIG. 3A, a minute antenna 13 having an IC chip 12 placed nearly on the center thereof and an ordinary antenna 15 having an IC chip 14 placed nearly on the center thereof are mounted on the surface of the male connector 1 included in the harness 200 so as to be parallel to each other. Each of the IC chip 12 and the IC chip 14 is housed in a small package that has, for example, a width of approximately 0.4 mm, a depth of approximately 0.4 mm, and a height of approximately 0.1 mm. Various kinds of information concerning the wire harness are previously recorded in the IC chip 12 and the IC chip 14.

The minute antenna 13 is so small that it can transmit only a weak radio wave in the same way as the first embodiment. For example, the minute antenna 13 has a size that is approximately 1.6 mm in width and approximately 7 mm in length. On the other hand, the ordinary antenna 15 is large enough to transmit information stored in the IC chip 14 with a strong wave as far as a position outside the wire harness 200 where the information can be read. (In other words, the ordinary antenna has a radio wave strength with which transmission over a distance of at least several tens cm can be conducted.) For example, the ordinary antenna 15 has a width of approximately 1.6 mm and an electrical length of approximately $\lambda/2$.

An auxiliary antenna 17 for amplifying a weak radio wave emitted by the minute antenna 13, transmitting the amplified radio wave to a desired direction, and intercepting a strong radio wave transmitted from the ordinary antenna 15 when hanging over the ordinary antenna 15 is mounted on the surface or inside face of the female connector 4 included in the wire harness. The auxiliary antenna 17 has an electrical length of $\lambda/2$ in order to transmit a strong radio wave. The auxiliary antenna 17 has a width of approximately 1.6 mm which is the same as the minute antenna 3 has.

Mounting positions of the minute antenna 13, the ordinary antenna 15, and the auxiliary antenna 17 have position relations so as to make the distance between the minute antenna 13 and the auxiliary antenna 17 equal to 1.0 mm or less (for example, approximately 0.5 mm) and the auxiliary antenna 17 hangs just over the ordinary antenna 15, when the male connector 1 is fitted into the female connector 4 normally.

In other words, if the male connector 1 is fitted into the female connector 4 normally as shown in FIG. 3B, the deviation between the minute antenna 13 and the auxiliary antenna 17 becomes approximately 0.5 mm, and consequently the weak radio wave emitted by the minute antenna 13 to transmit the information stored in the IC chip 12 can be amplified by the auxiliary antenna 17 and transmitted.

When the male connector 1 is fitted into the female connector 4 normally, the auxiliary antenna 17 hangs over the ordinary antenna 15, and consequently the strong radio wave transmitted from the ordinary antenna 15 is intercepted by the auxiliary antenna 17 and prevented from being transmitted to the outside.

When the male connector 1 is fitted into the female connector 4 normally, information stored in the IC chip 12 can be read via the auxiliary antenna 17 by the reader/writer, but information stored in the IC chip 14 placed on the ordinary antenna 15 cannot be read. By reading the information stored in the IC chip 12, it can be detected that the male connector is fitted into the female connector normally.

On the other hand, when the male connector 1 is not fitted into the female connector 4 normally, the deviation width between the minute antenna 13 and the auxiliary antenna 17 becomes larger than, for example, 0.5 mm, and consequently the auxiliary antenna 17 cannot amplify and transmit the weak radio wave emitted by the minute antenna 13. Under such an abnormal fitting state, however, the auxiliary antenna 17 does not completely hang over the ordinary antenna 15, and consequently the ordinary antenna 15 transmits a strong radio wave to the outside. Therefore, the reader/writer can read the information stored in the IC chip 14 placed on the ordinary antenna 15, and thereby it can be detected that the male connector is not fitted into the female connector normally. In this way, it is possible to distinguish between the state in which the male connector is fitted into the female connector normally and the state in which the male connector is not fitted into the female connector normally. In addition, when there are a plurality of wire harnesses, it is possible to identify connectors that are not fitted.

In the IC tag 18 mounted on harness 200 in the second embodiment as well, the minute antenna 13, the ordinary antenna 15 and the auxiliary antenna 17 can be formed by depositing a metal thin film over each of the connectors by means of evaporation. Or they can be formed by adhering metal foil to the connectors.

Instead of forming each of the minute antenna, the ordinary antenna and the auxiliary antenna on the surface or inside face of a connector as shown in FIGS. 2A-2B (the first embodiment) and FIGS. 3A-3B (the second embodiment), desired antennas may be formed by using vacant terminals on the connector and providing antenna wiring. For example, if wiring having a length of $\lambda/4$ connected to an IC chip is connected to an idle terminal on the male connector and wiring having a length of $\lambda/4$ is connected to an idle terminal on the female connector opposed to the male connector, an antenna of $\lambda/2$ is formed when the male connector is connected to the female connector and information indicating the connection state can be transmitted to the outside with a strong radio wave. In addition, if there are at least two idle terminals, an antenna of $\lambda/2$ is formed when the male connector and the female connector are connected to each other by, for example, connecting wiring having a length of λ/2 connected to an IC chip between two idle terminals on the male connector and connecting short-circuit wiring between two idle terminals on the female connector opposed to the male connector. Therefore, information stored in the IC chip to indicate the connection state can be transmitted to the outside. Besides, if wiring of various forms is provided by using idle terminals on the connector, a radio wave for distinguishing between the time when the male connector is connected to the female connector and the time when the male connector is not connected to the female connector can be transmitted to the outside.

Arrangement Pattern of Auxiliary Antenna

Figure 4A:
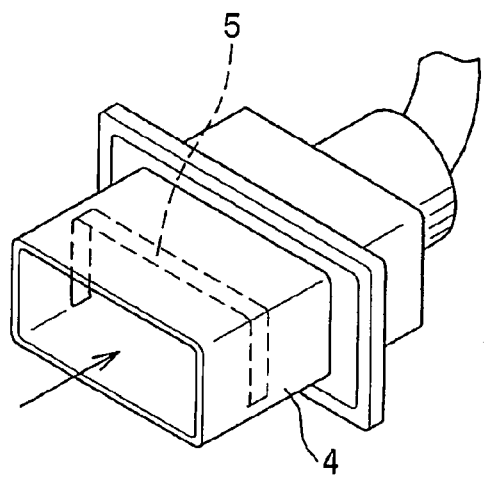
FIGS. 4A-4D are diagrams showing variations of an arrangement pattern of auxiliary antennas in the IC tag-mounted harnesses in the first embodiment and the second embodiment.
Figure 4B:
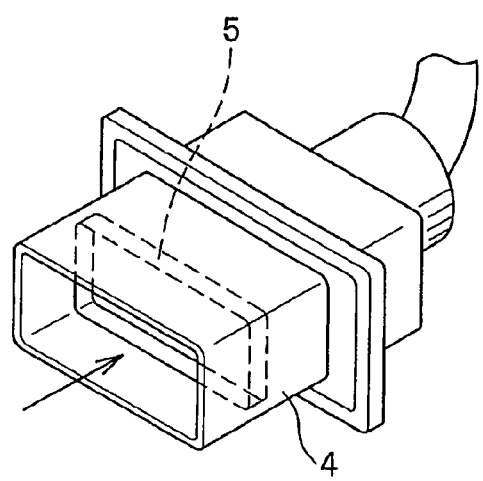
Figure 4C:
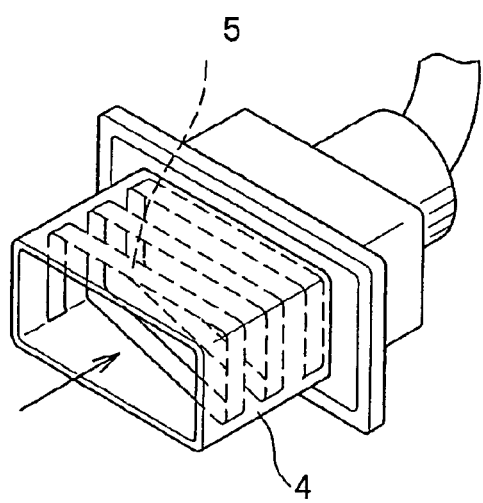
Figure 4D:
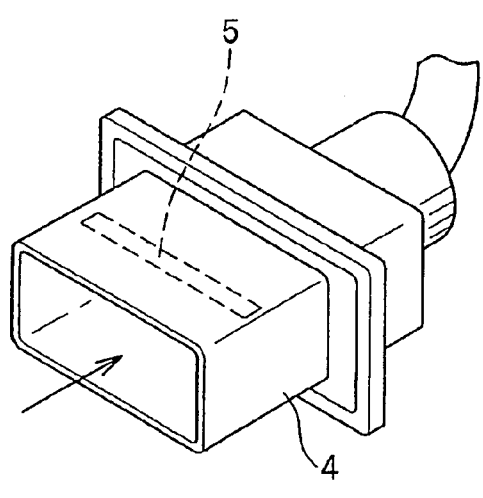

FIGS. 4A-4D are diagrams showing variations of an arrangement pattern on the auxiliary antenna in the IC tag mounting on connectors of a harness in the first embodiment and the second embodiment. When mounting an auxiliary antenna 5 on one of the connectors (for example, the female connector 4), the auxiliary antenna 5 is disposed so as to surround the insertion direction on the surface or inside face of the female connector 4 and take the shape of as shown in FIG. 4A. By doing so, the antenna length can be easily set to λ/2 even in a connector having a small size. As shown in FIG. 4B, the auxiliary antenna 5 may be wound and disposed in a single-turn loop form so as to surround the insertion direction on the inside face or surface of the female connector 4 to have an antenna length of, for example, λ. As shown in FIG. 4C, the auxiliary antenna 5 may be wound in a loop form having at least two turns so as to surround the insertion direction and one end of the auxiliary antenna 5 may be connected to the ground. If the connector is large, the auxiliary antenna 5 may not be disposed so as to take the shape of, but may be disposed straightly on one face perpendicular to the insertion direction of the female connector 4 in the same way as the first embodiment as shown in FIG. 4D. In this case as well, the antenna length is set equal to λ/2. Such a disposition method can be conducted on the auxiliary antenna 17 in the second embodiment as well.

THIRD EMBODIMENT

Figure 5A:
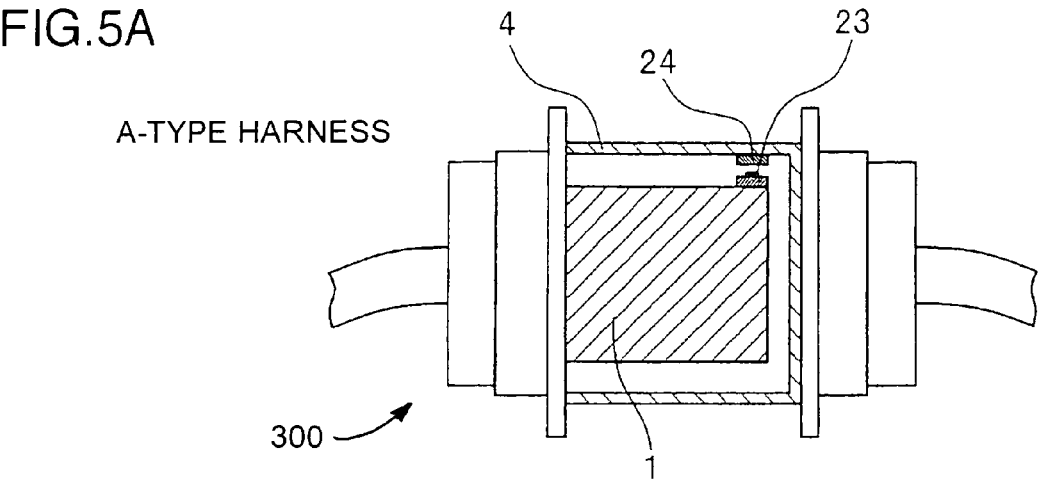
FIGS. 5A-5C are concept diagrams showing states in which wireless IC tags are mounted respectively so as to be associated with fitting purposes in wire harnesses having the same shape.
Figure 5B:
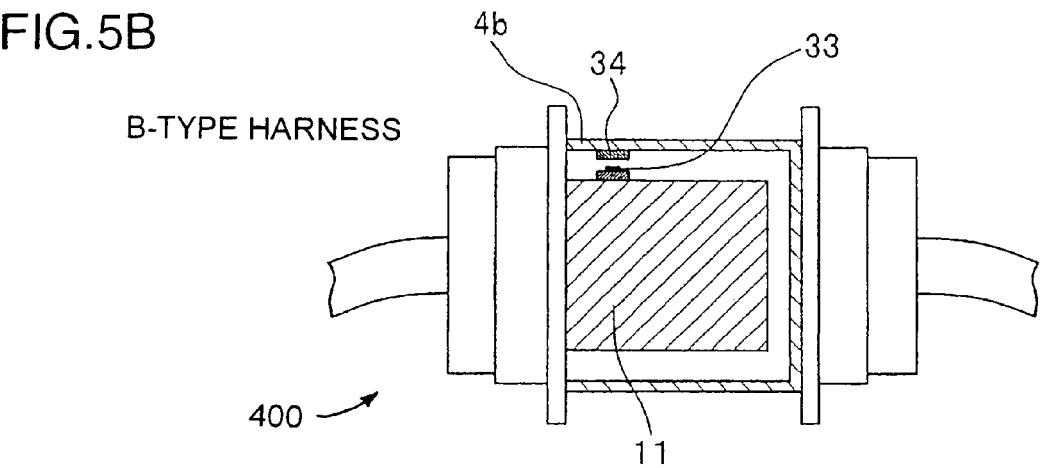
Figure 5C:
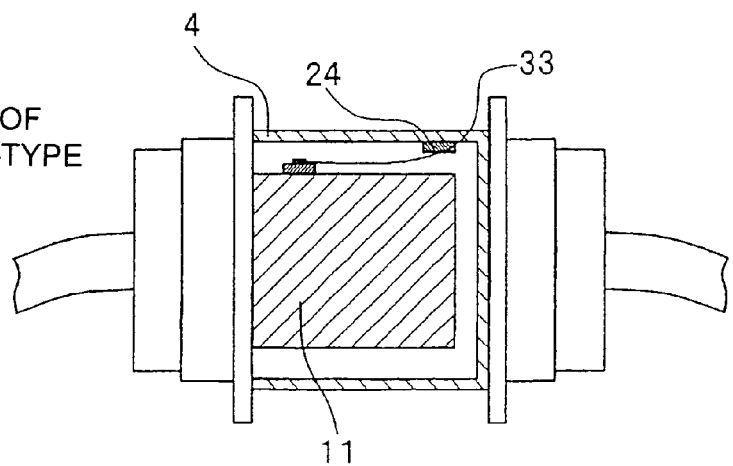

In a third embodiment, a method of preventing false fitting of connectors when a plurality of wire harnesses are included and connectors having the same shape are used will now be described. FIGS. 5A-5C are concept diagrams showing states in which wireless IC tags are mounted respectively so as to be associated with fitting purposes in wire harnesses having the same shape. In the case of an A-type harness 300, an IC chip 23 having a minute antenna is mounted on a forefront portion of the male connector 1 as shown in FIG. 5A. An antenna (auxiliary antenna) 24 is mounted in a position (i.e., the interior part) deviated at spacing of, for example, 0.5 mm from the minute antenna of the IC chip 23 on the female connector 4 so as to be able to receive a radio wave from the minute antenna of the IC chip 23. In FIG. 5A, an antenna 24, the IC chip 23, and its minute antenna are shown in the overlapped state for convenience. When the male connector 1 is fitted into the female connector 4 normally, therefore, the information stored in the IC chip 23 is transmitted from the minute antenna in the same way as the previously described embodiments, amplified by the antenna 24, and transmitted to the outside. Therefore, it can be detected that the male connector 1 in the A-type harness 300 is fitted into the female connector 4 normally, by reading the information stored in the IC chip 23.

In the case of a B-type harness 400, (i.e., a harness of a second type different from the A-type harness) an IC chip 33 having a minute antenna is mounted on a back portion of a male connector 11, and an antenna (auxiliary antenna) 34 is mounted on a female connector 4b in a position (i.e., an input portion of the female connector 4b) deviated with an interval of, for example, 0.5 mm from the minute antenna of the IC chip 33, as shown in FIG. 5B. In FIG. 5B, an antenna 34, an IC chip 33, and its minute antenna are shown in the overlapped state for convenience. When the male connector 11 is fitted into the female connector 4b normally, therefore, the information stored in the IC chip 33 is transmitted from the minute antenna, amplified by the antenna 34, and transmitted to the outside. Therefore, it can be detected that the male connector in the B-type harness 400 is fitted into the female connector normally, by reading the information stored in the IC chip 33.

If a mistake is made in the combination of the connectors in the A-type harness 300 and the connectors in the B-type harness 400 and false fitting is conducted, the information stored in the IC chip is not transmitted to the outside. In other words, if the male connector 11 in the B-type harness 400 is fitted into the female connector 4 in the A-type harness 300, as shown in FIG. 5C, the distance between the IC chip 33 disposed on the male connector 11 and the antenna 24 disposed on the female connector 4 is great, and consequently the information stored in the IC chip 33 is not transmitted by the antenna 24. Therefore, it is not possible to read the information stored in the IC chip 33 from the outside, and consequently it can be detected that the fitting is false fitting. If disposition positions of the IC chip and the antenna are changed and set from harness to harness, therefore, false fitting can be detected even if a large number of harnesses are used.

A method of preventing false connection in harnesses by using a computer will now be described.

First, when manufacturing a wire harness, IC chips are mounted respectively on the male connector and the female connector, and their ID numbers are recorded in a database. If the male connector is fitted into the female connector normally, each of the IC chips can conduct transmission owing to the function of the auxiliary antenna as shown in FIG. 2B in the same way as the above-described embodiments. At that time, bits in a transmission signal caused by radio interference are output in an OR form. Therefore, this information is recorded in the database. At this time, it is confirmed that the bit signal of the OR is not output when a male connector is fitted into a female connector in a different combination. Subsequently, the male connector and the female connector are mounted on, for example, an automobile electrical component or a semiconductor manufacturing apparatus. If the male connector is fitted into the female connector normally, the registered combinational bits are output in the OR form. Therefore, this OR signal is compared and collated with OR information recorded in the database. If the output OR signals are, for example, registered ID1 and ID2 as a result of the comparison and collation, the male connector is judged to have been fitted into the female connector normally. In the same way, in an IC chip having a congestion function, a decision concerning the fitting can be made by recording IDs of connectors in the database and comparing and collating two coupled ID information data. According to such a technique, false harness connection can be detected even if the disposition positions of the IC chip and the auxiliary antenna are not shifted in every wire harness.

If the male connector is fitted into the female connector normally even in a harness including a minute antenna, an ordinary antenna, and an auxiliary antenna as shown in FIGS. 3A-3B, normal OR signals are output as, for example, ID1 and ID2. As a result, it can be determined that the male connector is fitted into the female connector normally.

FOURTH EMBODIMENT

Figure 6:
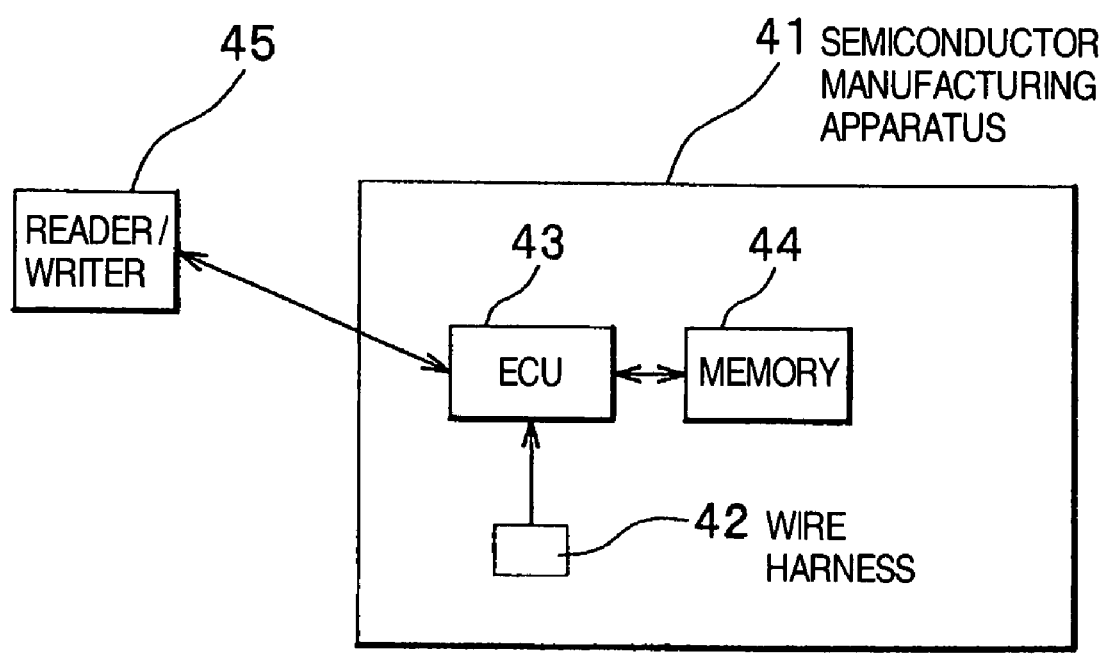
FIG. 6 is a concept diagram of a semiconductor manufacturing apparatus for implementing a harness mounting method according to the present invention.

The IC tag-mounted harness having the above-described configuration can be used for wiring systems of semiconductor manufacturing apparatuses, various electrical apparatuses, and automobile electrical components. Hereafter, taking a wiring system of a semiconductor manufacturing apparatus having a large number of harnesses as an example, a harness mounting method used when mounting wire harnesses on the semiconductor manufacturing apparatus by using IC tag-mounted harnesses according to the present invention will be described as a fourth embodiment. FIG. 6 is a concept diagram of a semiconductor manufacturing apparatus for implementing a harness mounting method according to the present invention. As shown in FIG. 6, at least an ECU (electronic control unit) 43 for reading ID information of a wire harness 42 and exercising various kinds of control, and a memory 44 provided outside or inside the ECU 43 to store ID information of the IC tag-mounted wire harness 42 are mounted on a semiconductor manufacturing apparatus 41. A reader/writer 45 disposed outside the semiconductor manufacturing apparatus 41 can read the ID information of the wire harness 42 from the ECU 43.

Figure 7:
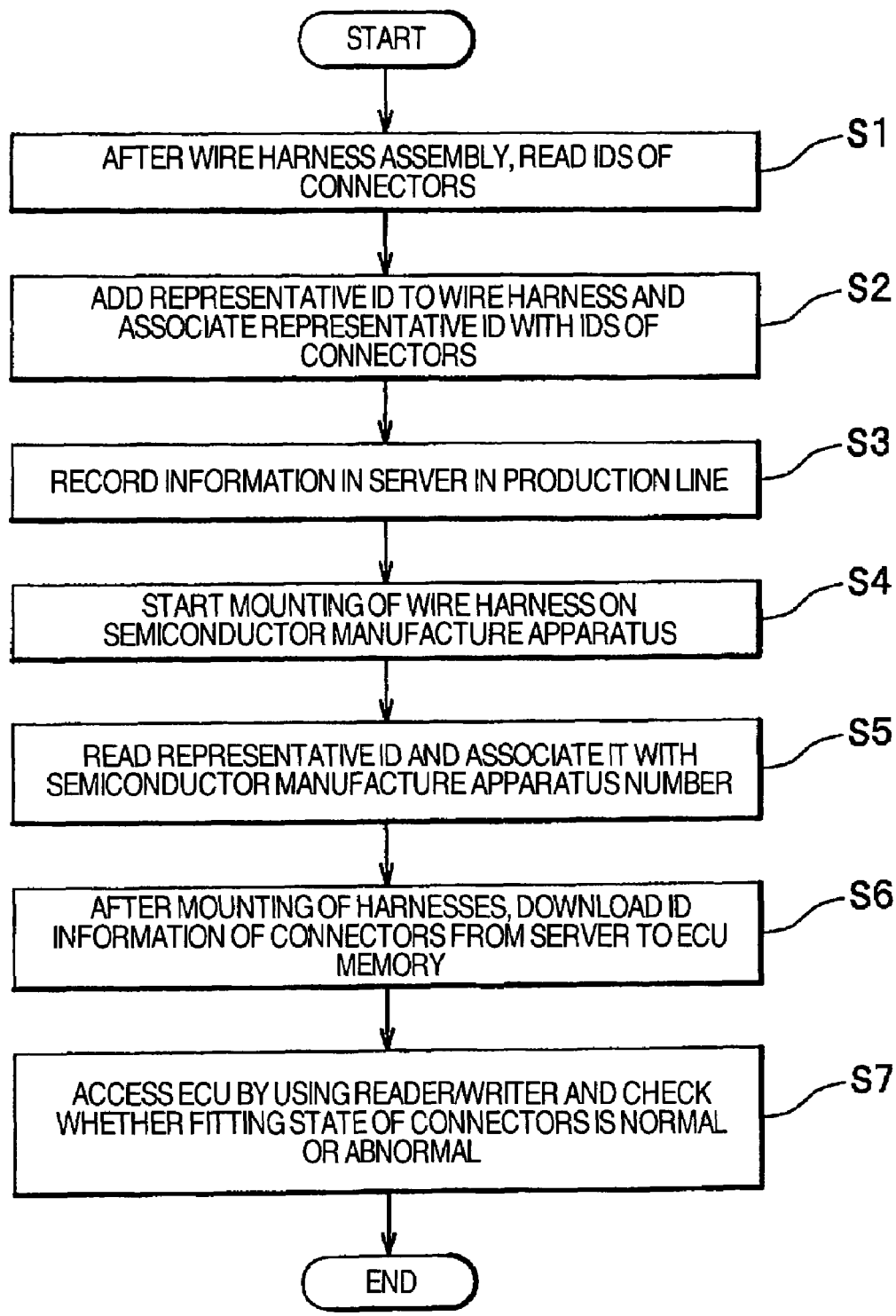
FIG. 7 is a flow chart for implementing a method of mounting a harness on a semiconductor manufacturing apparatus according to the present invention.

FIG. 7 is a flow chart for implementing a method of mounting a harness on a semiconductor manufacturing apparatus according to the present invention. In this flow chart, a wire harness assembly process and a process for mounting wire harnesses on the semiconductor manufacturing apparatus are shown. First, in the wire harness assembly process, IDs of connectors are read at the time of energization test after completion of the wire harness assembly (step S1). Subsequently, an IC tag is mounted on the wire harness including the connectors, and a representative ID is added to the IC tag and associated with the IDs of the connectors (step S2). In addition, these kinds of information are recorded in a server in a production line (step S3). The assembly process of the wire harness 42 is thus finished.

Subsequently, in the process of mounting the wire harness 42 on the semiconductor manufacturing apparatus 41, work of mounting the wire harness 42 on the semiconductor manufacturing apparatus 41 is started (step S4). The representative ID of the wire harness 42 is read, and the representative ID is associated with an apparatus number of the semiconductor manufacturing apparatus 41 (step S5). In addition, after respective wire harnesses and the ECU 43 are mounted and inspection of the wiring line is finished, IDs of the connectors are associated with the representative ID of the wire harness 42, and downloaded from the server to the memory 44 via the ECU 43 (step S6).

As for components other than the connectors as well, ID information of components (such as important security components) provided with IDs is downloaded to the memory 44. At the time of inspection of the semiconductor manufacturing apparatus 41 or at the time of connection from the semiconductor manufacturing apparatus 41 to a network, therefore, repair or the like can be conducted on the basis of information of the components.

At step S6, the representative ID of the wire harness 42 and IDs of the connectors are associated with each other and stored in the memory 44. If the reader/writer 45 accesses the ECU 43, therefore, the representative ID of the wire harness 42 and IDs of the connectors stored in the memory 44 are read into the reader/writer 45 and it is checked whether the fitting state of the connectors are normal (step S7). The process of mounting the wire harness on the semiconductor manufacturing apparatus is thus finished.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An IC tag mounting for a connector having a wireless IC tag mounted on the connector, the wireless IC tag including an IC chip to record information and an antenna to conduct wireless transmission of the information recorded on the IC chip, the IC tag mounting comprising:

a first connector having the IC chip and a first antenna mounted thereon, the first antenna being capable of transmitting the information recorded on the IC chip; and a second connector having an auxiliary antenna mounted thereon to amplify a transmission emitted by said first antenna and for transmitting the amplified transmission, said auxiliary antenna being a plane antenna, wherein said auxiliary antenna is mounted so as to be located in a position suitable for amplifying the transmission emitted by said first antenna when said first connector and said second connector are connected with each other in a normal fashion, and wherein said auxiliary antenna is mounted so as to surround an insertion end in an accepting frame at right angles to an insertion direction of said second connector, take a shape of, and have an electrical length of $\lambda/2$, where $\lambda$ is a wavelength of a radio wave use in said transmission.

2. An IC tag mounting for a connector having a wireless IC tag mounted on the connector, the wireless IC tag including an IC chip to record information and an antenna to conduct wireless transmission of the information recorded on the IC chip, the IC tag mounting comprising:

a first connector having the IC chip and a first antenna mounted thereon, the first antenna being capable of transmitting the information recorded on the IC chip; and a second connector having an auxiliary antenna mounted thereon to amplify a transmission emitted by said first antenna and for transmitting the amplified transmission, said auxiliary antenna being a plane antenna, wherein said auxiliary antenna is mounted so as to be located in a position suitable for amplifying the transmission emitted by said first antenna when said first connector and said second connector are connected with each other in a normal fashion, and wherein said auxiliary antenna is mounted at right angles to an insertion direction of said second connector so as to have an electrical length of $\lambda/2$ along one plane of an accepting frame, where $\lambda$ is a wavelength of a radio wave used in said transmission.

3. The IC tag mounting according to claim 2, wherein said first and second connectors are used for connecting a plurality of harnesses, and positions of antennas mounted on said first connector and said second connector differ from harness to harness.

4. An IC tag mounting for a connector having a wireless IC tag mounted on the connector, the wireless IC tag including an IC chip to record information and an antenna to conduct wireless transmission of the information recorded on the IC chip, the IC tag mounting comprising:

a first connector having the IC chip and a first antenna mounted thereon, the first antenna being capable of transmitting the information recorded on the IC chip; and a second connector having an auxiliary antenna mounted thereon to amplify a transmission emitted by said first antenna and for transmitting the amplified transmission, said auxiliary antenna being a plane antenna, wherein said auxiliary antenna is mounted so as to be located in a position suitable for amplifying the transmission emitted by said first antenna when said first connector and said second connector are connected with each other in a normal fashion, and wherein said auxiliary antenna is mounted at right angles to an insertion direction of said second connector so as to form one turn with an electrical length of $\lambda/2$ and surround an insertion end in an accepting frame, where $\lambda$ is a wavelength of a radio wave used in said transmission.

5. An IC tag mounting of a wireless IC tag mounted on a harness, the harness being used for electrical connection among a plurality of electrical members, the wireless IC tag including an IC chip for recording information and an antenna for conducting wireless transmission of the information recorded on the IC chip, the IC tag mounting harness comprising:

a first connector mounting a first IC chip to record first information, a first antenna to transmit, with a weak radio wave, the information recorded in said first IC chip, a second IC chip to record second information, and a second antenna to transmit, with a strong radio wave, information recorded in said second IC chip, said first connector being connected to a first electrical member;

a second connector mounting an auxiliary antenna being capable of amplifying a radio wave emitted by said first antenna and transmitting the amplified radio wave, said auxiliary antenna being capable of hanging over said second antenna and intercepting the strong radio wave emitted by said second antenna, said second connector being connected to electrical members other than the first electrical member, wherein said auxiliary antenna is mounted so as to be located in a position suitable for amplifying the radio wave emitted by said first antenna, transmitting the amplified radio wave, and hanging over said second antenna, when said first connector and said second connector are connected with each other in a normal fashion.

6. The IC tag mounting according to claim 5, wherein said auxiliary antenna is mounted so as to surround an insertion end in an accepting frame at right angles to an insertion direction of said second connector, take a shape of, and have an electrical length of $\lambda/2$, where $\lambda$ is a wavelength of a radio wave in use.

7. The IC tag mounting according to claim 5, wherein said auxiliary antenna is mounted at right angles to an insertion direction of said second connector so as to form at least two turns and surround an insertion end in an accepting frame and so as to be connected to ground at one end.

8. The IC tag mounting according to claim 5, wherein a plurality of harnesses are provided, and positions of antennas mounted on said first connector and said second connector differ from harness to harness.

9. The IC tag mounting according to claim 5, wherein a plurality of harnesses are provided, and it is checked whether said first connector and said second connector is fitted into the other in a normal fashion in each of the harnesses on a basis of ID information described in said first connector and said second connector.

* * * * *